United States Patent [19]

Grundei et al.

[11] Patent Number: 5,655,634
[45] Date of Patent: Aug. 12, 1997

[54] SHOCK ABSORBERS AND VIBRATION DAMPERS; AND SHOCK ABSORBERS AND VIBRATION DAMPERS WITH A PISTON WITH A PISTON RING; AND A CYCLINDER WITH A PISTON WITH A PISTON RING

[75] Inventors: Manfred Grundei, Niederwerrn; Norbert Deppert, Gochsheim; Peter Wölki, Mönchengladbach; Robert Wieser, Viersen, all of Germany

[73] Assignee: Fichtel & Sachs AG, Schweinfurt, Germany

[21] Appl. No.: 589,025

[22] Filed: Jan. 19, 1996

[30] Foreign Application Priority Data

Jan. 21, 1995 [DE] Germany .............. 195 01 792.7

[51] Int. Cl.[6] ......................................... F16F 9/36
[52] U.S. Cl. .............................. 188/322.18; 188/322.16; 92/193
[58] Field of Search ............... 188/322.18, 322.16, 188/322.22; 92/193, 246; 277/103, 173, 174

[56] References Cited

U.S. PATENT DOCUMENTS

| 3,212,411 | 10/1965 | Storms . | |
|---|---|---|---|
| 3,645,174 | 2/1972 | Prasse | 92/193 |
| 4,376,472 | 3/1983 | Heyer | 188/322.22 |
| 4,508,201 | 4/1985 | Axthammer | 188/322.19 |

FOREIGN PATENT DOCUMENTS

| 2730112 | 1/1979 | Germany . |
| 4032609 | 1/1992 | Germany . |
| 4410996 | 6/1995 | Germany . |

*Primary Examiner*—Robert J. Oberleitner
*Assistant Examiner*—C. T. Bartz
*Attorney, Agent, or Firm*—Nils H. Ljungman and Associates

[57] ABSTRACT

A shock absorber with an affixed or clamped-on piston ring for a piston-cylinder unit, whereby the piston ring covers a lateral surface of the piston and creates a seal with respect to the cylinder, characterized by the fact that the piston ring has a width which is greater than the lateral surface, so that there is a projecting end of the piston ring with respect to the piston, which projecting end is shaped into a spring end which is supported on the cover side on the piston.

20 Claims, 5 Drawing Sheets

SHOCK ABSORBERS AND VIBRATION DAMPERS; AND SHOCK ABSORBERS AND VIBRATION DAMPERS WITH A PISTON WITH A PISTON RING; AND A CYCLINDER WITH A PISTON WITH A PISTON RING

BACKGROUND OF THE INVENTION

1. Field of the Invention

This invention relates to a shock absorber or vibration damper with a piston with a piston ring, seal, gasket or packing.

2. Background Information

A similar piston is described, for example, in U.S. Pat. No. 3,212,411. This piston has a contoured or shaped peripheral piston surface which is covered by the piston packing. The profile forms a positive or interlocking connection with the piston ring.

When the profile is manufactured, a tool must be inserted from radially outside, so that a piston made of sintered metal or a piston made of sheet metal must be subjected to an additional machining operation. On a piston made from a sheet metal blank which is particularly flat, the necessary lateral surface for sufficient contouring or shaping is not always attainable.

OBJECT OF THE INVENTION

An object of this invention is to realize a piston, such as for a vibration damper or shock absorber, with a piston ring which makes possible the simple manufacture of the piston using sintering or sheet metal shaping processes, without any undesirable finishing machining operations. An additional object of the invention is to make it possible to use this method for very flat pistons.

Another object of this invention is to realize a piston with a piston ring which makes possible the simple manufacture of the piston using sintering or sheet metal shaping processes, without any undesirable finishing machining operations. An additional object of the invention is to make it possible to use this method for very flat pistons.

SUMMARY OF THE INVENTION

The invention teaches that this object can be accomplished if the piston ring has a width which is greater than the width of the lateral surface, so that there is a projecting end of the piston ring with respect to the piston, which projecting end is shaped into a spring end which is supported on the cover or covering side on the piston.

The spring ends have the advantage that compensation can be provided for relatively large tolerances on the piston ring, or with regard to the width of the lateral surface of the piston. Furthermore, because the piston ring is supported on the cover side on the piston, a radial recess or groove or contour of the piston in the vicinity of the lateral surface can be avoided.

As disclosed by an additional advantageous characteristic, the lateral surface of the piston is located inside the width of the piston ring, so that two projecting ends are formed, the spring ends of which are each engaged on opposite ends of the piston. Thus the piston ring can be securely and correctly installed on the piston.

In one advantageous embodiment, the spring end is realized in the shape of a circular arc. The result is a type of annular spring which holds the piston ring axially, but also applies a bias to the part which covers the lateral surface of the piston. It has thereby been found to be advantageous if the spring end which is shaped in the form of a circular arc extends over an angle of at least 270 degrees. It thereby becomes possible to reliably prevent an unintentional opening of the spring end. Any stamping burrs which may remain are surrounded by the radii in the vicinity of the support on the piston. The contact area of the piston ring includes the lateral surface and twice the coil radius of the spring ends in the form of a circular arc.

In one alternative embodiment, the spring end is realized in the form of a plate or dish or disk. The shielding of the spring end is thereby oriented toward the part of the piston ring covering the lateral surface. The percentage contact area corresponds to the width of the lateral surface on the piston and twice the shielding length of the spring end. Once again, an opening of the spring end is prevented, among other things by a shoulder of the piston on which the spring end is supported. The spring end is advantageously supported axially on a contact surface of the shoulder which is realized parallel to the end surface of the spring end. Compression stress peaks in the piston ring are minimized by the maximal contact surface.

In an additional advantageous embodiment, the spring end is shaped using a plurality of transitions in the form of circular arcs. It is thereby appropriate if the spring end is folded into a spring stack or set. The piston ring is thereby reliably prevented from being pulled off the piston.

Alternatively, the spring end can be supported by means of one outer side on a transition in the shape of a circular arc, and extends increasingly radially outward in the terminal area.

With regard to manufacturing, a piston has advantages if the spring end of the piston ring is supported with its inside by means of a transition in the shape of a circular arc, and extends in the terminal area toward the center axis of the piston. In connection with a spring end which is supported on the piston, a bias force can be exerted on the piston ring by means of the support.

To increase the effect of the bias force, the spring end comprises or includes a plurality of individual spring studs or pins or webs. Alternatively, the piston ring can also be supported on an upper or lower side of the piston, so that there is no need to create the shoulder by forging, stamping or machining.

To enhance the spring action, the piston ring comprises or includes a sealing layer and a spring carrier layer.

BRIEF DESCRIPTION OF THE DRAWINGS

The present invention is illustrated in the accompanying drawings, in which.

DESCRIPTION OF THE PREFERRED EMBODIMENT

Figure 1:
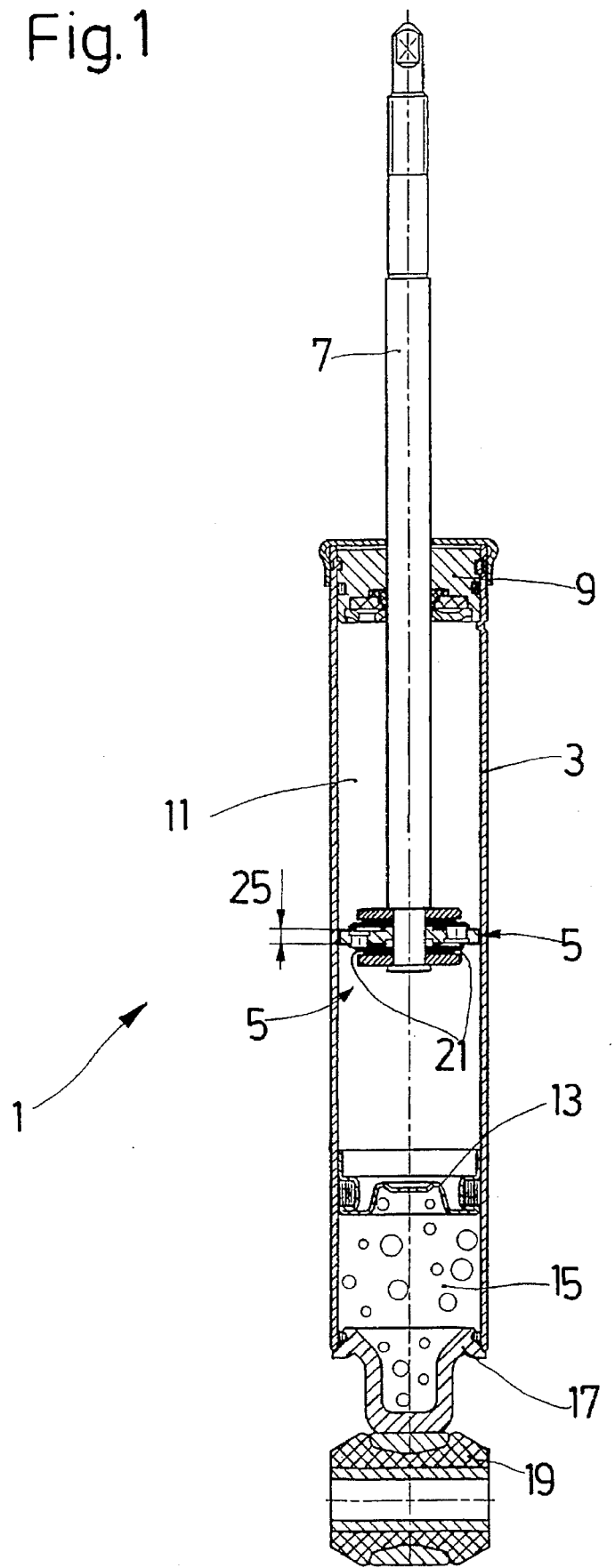
FIG. 1 is an overall view of the piston-cylinder unit.

FIG. 1 shows, by way of example, a piston-cylinder unit 1 in an embodiment as a single-tube vibration damper.

Basically, the teaching of the invention can also be used in other applications.

The piston-cylinder unit 1 comprises or consists essentially of a cylinder 3, in which a piston 5 is located on a piston rod 7 so that it can move axially. On the side where the piston rod 7 exits the cylinder 1, a piston rod guide 9 closes a working chamber 11 which is filled with damping medium. The working chamber 11 is separated by a separating piston 13 from a gas chamber 15 which has a bottom 17 with a lug 19 on the end.

When there is a movement of the piston rod 7, damping medium is displaced through damping valves 21 in the piston 5. A piston ring 23 which covers a lateral surface 25 of the piston 5 prevents the damping medium from flowing around the sides of the piston 5.

Figure 2:
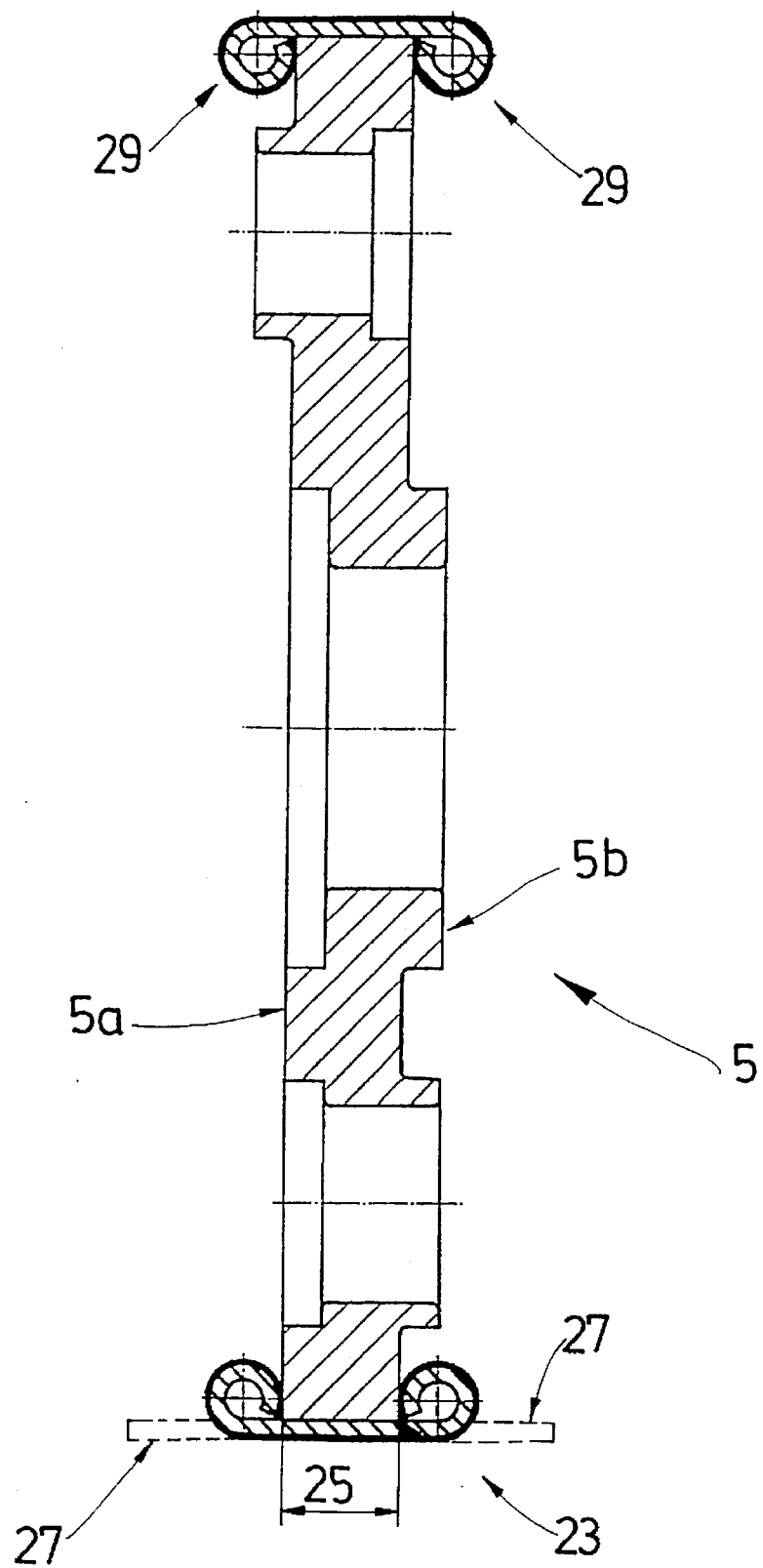
FIG. 2 shows the piston with the piston ring and the spring ends formed in the shape of circular arcs.

FIG. 2 is restricted to an illustration of the piston 5 with the piston ring 23. In this variant, the piston 5 is manufactured by shaping a sheet metal blank. The volume percentages which are convex on the upper side 5a are formed by parts on the underside 5b with equal volume. Consequently, no cutting machining operations need to be performed.

The piston ring 23, in its original state, has a width which is greater than the width of the lateral surface 25 of the piston 5. The result is the presence of projecting ends 27, which in this variant are realized in the shape of a circular arc. The piston ring 23 corresponds symmetrically to the lateral surface 25, so that there are two projecting spring ends 29. The spring ends 29 thereby extend over an angle of more than 270 degrees. The piston ring 23 can be realized with a joint of any desired shape,. so that no special shaping tools are required for the assembly. The piston ring 23 is supported by means of the spring ends 29 on the upper and lower side 5a/5b of the piston 5.

Figure 3:
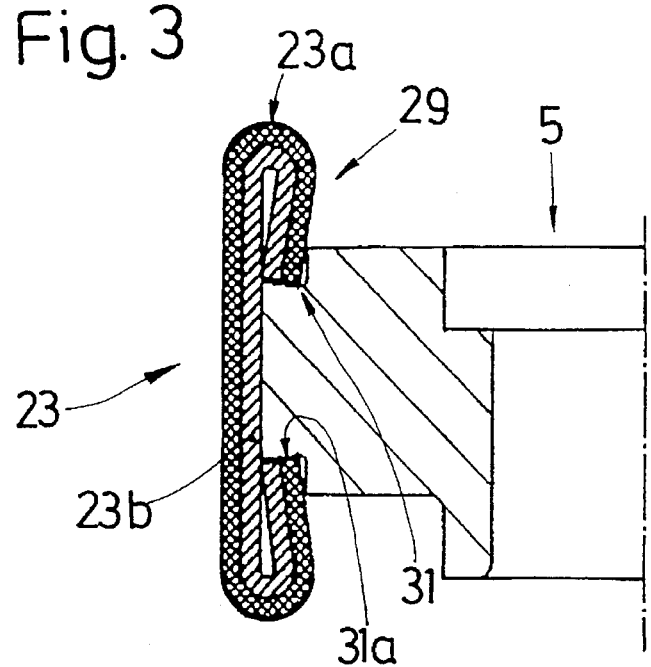
FIGS. 3 and 3c show a piston ring, the spring ends of which are realized in the form of plates or dishes or disks.
Figure 3C:
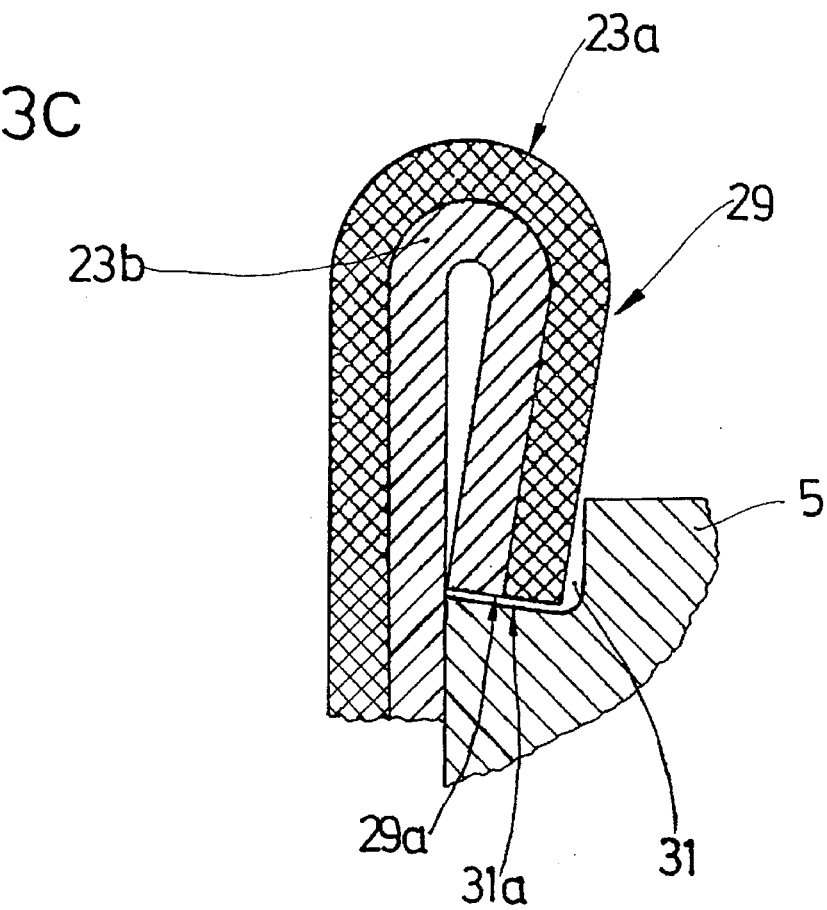

In the variant embodiment illustrated in FIGS. 3 and 3c, the projecting or spring ends 29 are realized in the form of plates. The shielding of the respective spring end 29 is thereby oriented toward the portion of the piston ring 23 covering the lateral surface 25 (see also the embodiment of FIG. 3A). In this figure, the piston ring 23 comprises or consists of a sealing layer 23a and a spring carrier layer 23b. This construction can also be used in the embodiment illustrated in FIG. 2. The spring end 29 has a tendency to open, but the opening movement is prevented by a shoulder 31 on which the spring end 29 is supported. The contact surface 31a of the shoulder 31 runs parallel to the end surface 29a of the spring end 29, so that essentially no thrust stresses can flow into the piston ring 23. The above-mentioned shoulder 31 can be easily manufactured by sintering or shaping processes, so that no additional machining steps need to be performed.

Figure 4:
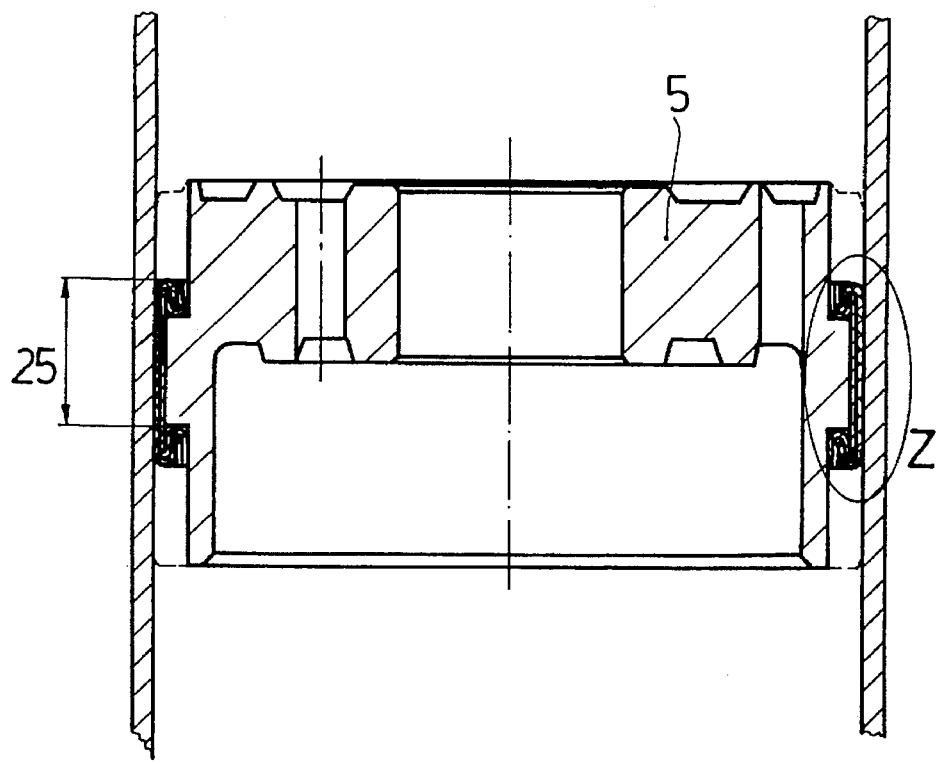
FIGS. 4 and 5 and 5A illustrate additional embodiments of the piston ring.

FIG. 4 is restricted to the illustration of a piston 5, as used in piston-cylinder units which are required to absorb significant lateral guidance forces, which increases the load on the piston itself.

Figure 3A:
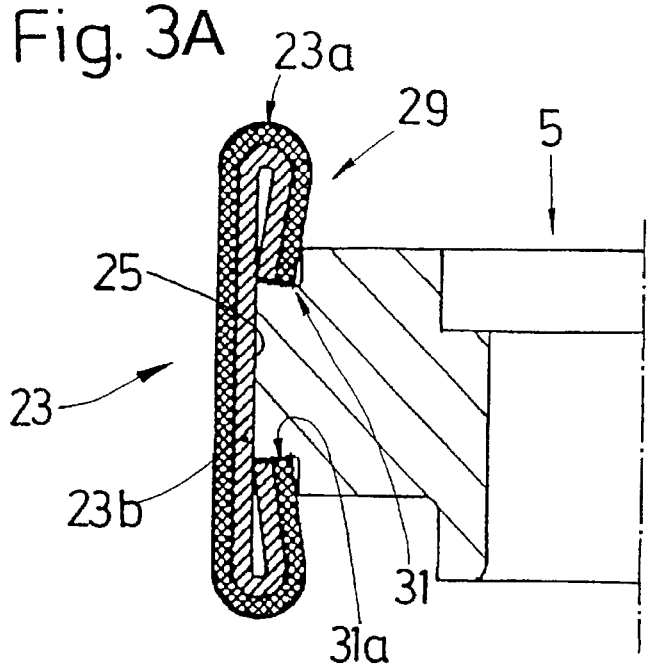
FIGS. 3A and 3B show a piston ring, the spring ends of which are realized in the form of plates or dishes or disks.
Figure 3B:
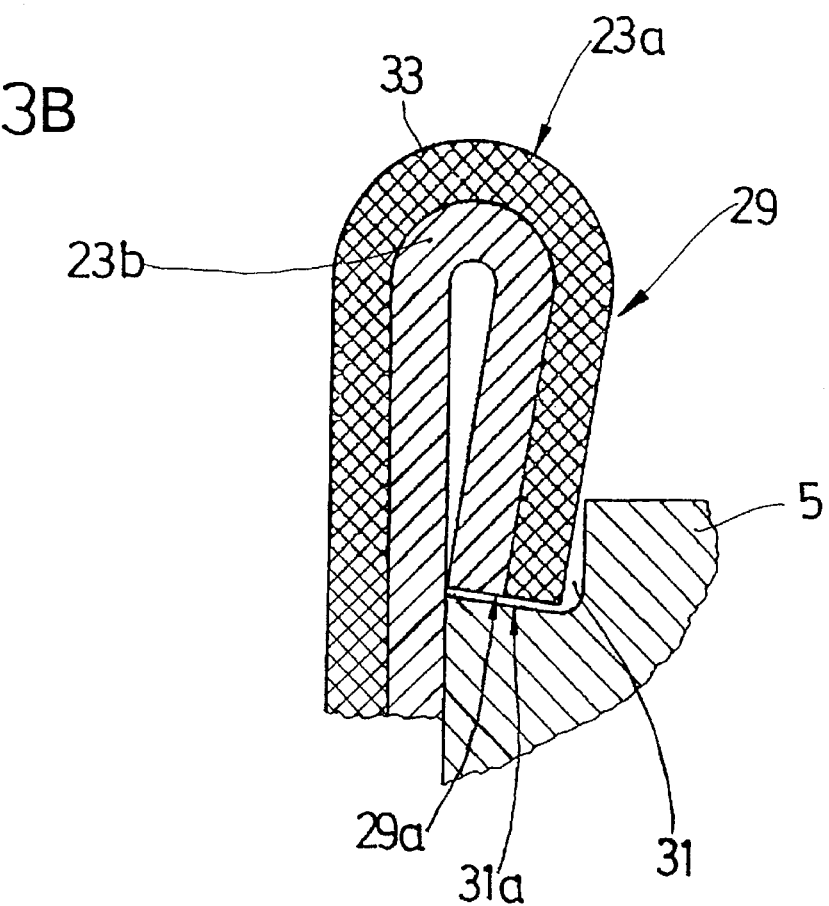

To respond to these particular requirements, a piston ring 23 is used which achieves a combination of the advantages of the embodiments illustrated in FIGS. 2, 3 and 3a.

The piston 5, which in this embodiment is manufactured by sintering, without the necessity for radial grooves for the piston ring, has contact surfaces 31a on which a transition 33 in the form of a circular arc of the spring end 29 is braced. The entire spring end is folded into a stack, so that there is a contact length which comprises or consists of the lateral surface 25 of the piston 5 plus twice the circular arc radius of the shaped ends 33 and twice the length of the fold 33a (see FIG. 5A) 1 to the center point of the transition 33 into the part of the piston ring which faces the cylinder.

Figure 5:
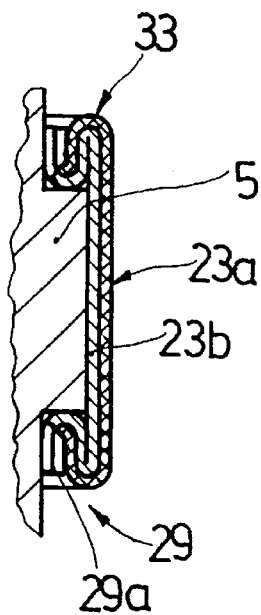
Figure 5A:
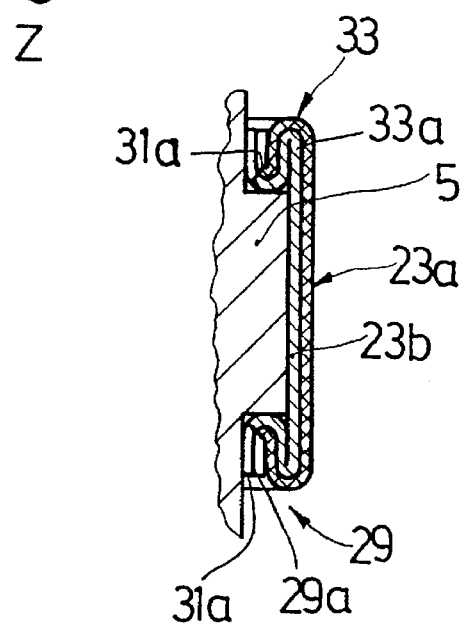

In FIGS. 5 and 5A, as also illustrated in FIG. 4, the spring end 29 is shaped by transitions 33 in the form of circular arcs, whereby the spring end 29 comes into contact with the piston radially. The spring end 29 is supported by means of its inside on the piston 5. In particular on piston rings 23 which consist of a sealing layer 23a and a spring carrier layer 23b, the contact by means of the carrier layer means that no load is applied to the more sensitive sealing layer. The spring end 29 consists of individual spring studs 29a, so that by means of the contact with the piston 5, a radial bias of the piston ring 23 against the piston 5 with respect to the cylinder can be created. Overall, the piston ring 23, with respect to the radial direction of motion, remains more elastic and less sensitive to tolerances on account of the individual spring studs 29a.

The radical bias of the piston ring 5 onto the cylinder 3 creates at least a sealing force which tends to assist sealing of the piston 5 against the cylinder 3.

One feature of the invention resides broadly in the piston with affixed or clamped-on piston ring for a piston-cylinder unit, whereby the piston ring covers a lateral surface of the piston and seals it with respect to the cylinder, characterized by the fact that the piston ring 23 has a width which is greater than the lateral surface 25, so that there is a projecting end 27 of the piston ring with respect to the piston 5, which is shaped or transformed by non-cutting methods into a spring end 29 which is supported on the cover side on the piston.

Another feature of the invention resides broadly in the piston characterized by the fact that the lateral surface 25 of the piston 5 is located inside the width of the piston ring 23, so that there are two projecting ends 27, the spring ends 29 of which are each engaged opposite one another on the piston 5.

Yet another feature of the invention resides broadly in the piston ring 23 characterized by the fact that the spring end 29 is bent in the shape of a circular arc.

Still another feature of the invention resides broadly in the piston characterized by the fact that the spring end 29 in the shape of a circular arc covers an angle of more than 270 degrees.

A further feature of the invention resides broadly in the piston characterized by the fact that the spring end 29 is realized in the form of a plate or dish or disk.

Another feature of the invention resides broadly in the piston characterized by the fact that the shielding or effect of the spring end 29 is oriented toward the part of the piston ring 23 which covers the lateral surface 25.

Yet another feature of the invention resides broadly in the piston characterized by the fact that the spring end 29 is supported on a shoulder or offset 31 of the piston.

Still another feature of the invention resides broadly in the piston characterized by the fact that the spring end 29 is axially supported on a contact surface 31a of the shoulder 31 which is realized parallel to the end surface 29a of the spring end 29.

A further feature of the invention resides broadly in the piston characterized by the fact that the spring end 29 is shaped or transformed several times using transitions 33 in the shape of a circular arc.

Another feature of the invention resides broadly in the piston characterized by the fact that the spring end 29 is folded into a spring stack or set.

Yet another feature of the invention resides broadly in the piston characterized by the fact that the spring end 29 is supported with one outer side by means of a transition 33 in the shape of a circular arc, and in the terminal area extends increasingly radially outward.

Still another feature of the invention resides broadly in the piston characterized by the fact that the spring end 29 is supported with its inside by means of a transition in the shape of a circular arc, and extends in the terminal area toward the center axis of the piston.

A further feature of the invention resides broadly in the piston characterized by the fact that the spring end is supported on the piston.

Another feature of the invention resides broadly in the piston characterized by the fact that the spring end 29 consists of a plurality of individual spring studs or pins or webs.

Yet another feature of the invention resides broadly in the piston characterized by the fact that the piston ring 23 is supported on an upper and a lower side 5a/5b of the piston 5.

Still another feature of the invention resides broadly in the piston characterized by the fact that the piston ring 23 comprises or consists of a sealing layer 23a and a spring carrier layer 23b.

All, or substantially all, of the components and methods of the various embodiments may be used with at least one embodiment or all of the embodiments, if more than one embodiment is described herein.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber for a motor vehicle, said shock absorber comprising:

a cylinder comprising a cylinder wall, a first end, and a second end;

said cylinder defining a chamber therein, said chamber containing a damping fluid;

a piston rod sealingly projecting into said cylinder and being axially displaceable with respect to said cylinder;

said piston rod having a longitudinal axis, the longitudinal axis having an axial direction parallel to the longitudinal axis of said piston rod;

a piston being attached to said piston rod, said piston being slidably disposed within said cylinder to divide said chamber into first and second chambers;

said piston comprising a lateral surface disposed to face towards said cylinder wall;

said piston comprising a first axial surface disposed to face towards said first end of said cylinder;

said piston comprising a second axial surface disposed to face towards said second end of said cylinder;

a piston ring being disposed to provide a seal between said piston and said cylinder wall;

said piston ring being disposed to cover said lateral surface of said piston;

said piston ring having a width dimension in the axial direction;

said lateral surface of said piston having a width dimension in the axial direction;

said piston ring width dimension being greater than said lateral surface width dimension;

said piston ring comprising a middle portion, a first end portion, and a second end portion, said first end portion and said second end portion extending in substantially opposite axial directions from said middle portion;

said first end portion comprising a bent around portion to engage at least said first axial surface of said piston; and said bent around portion being bent around substantially on itself.

2. The shock absorber as claimed in claim 1, wherein:

said bent around portion is a first bent around portion;

said second end of said piston ring comprises a second bent around portion to engage said second axial surface of said piston; and said second bent around portion is bent around substantially on itself.

3. The shock absorber as claimed in claim 2, wherein said first and second bent around portions are each bent in the shape of a substantially circular arc.

4. The shock absorber as claimed in claim 3, wherein said circular arc extends over an angle of more than 270 degrees.

5. The shock absorber as claimed in claim 1, wherein said bent around portion is bent in the shape of a folded over portion bent over on itself.

6. The shock absorber as claimed in claim 5, wherein said folded over portion is bent greater than 180 degrees to be directed toward said middle portion of said piston ring.

7. The shock absorber as claimed in claim 5, wherein:

said first axial surface of said piston comprises a shoulder surface disposed adjacent to said lateral surface of said piston; and said folded over portion of said piston ring is supported on said shoulder.

8. The shock absorber as claimed in claim 7, wherein:

said first end portion of said piston ring comprises an end surface disposed at an edge of said first end portion;

said shoulder comprises a contact surface disposed substantially parallel to said end surface to contact said end surface to axially support said first end portion.

9. The shock absorber as claimed in claim 1, wherein:

said bent around portion comprises a plurality of bent over portions;

adjacent bent over portions are connected by a transition fold; and said transition fold is bent in the shape of a circular arc.

10. The shock absorber as claimed in claim 9, wherein said plurality of bent over portions comprises a plurality of folded over portions each folded over one another to form a stack of folded over portions in a serpentine shape.

11. The shock absorber as claimed in claim 9, wherein:

said transition fold bent in the shape of a circular arc is disposed to engage said first axial surface of said piston;

said first end portion comprises an end surface disposed et an edge of said first end portion; and said end surface is disposed to face towards said first end of said cylinder.

12. The shock absorber as claimed in claim 9, wherein:

said middle portion of said piston ring comprises an inside surface disposed towards said piston and an outside surface disposed towards said cylinder wall;

said first end portion of said piston ring comprises an inside surface continuous with said inside surface of said middle portion;

said first end portion is disposed to be supported by said inside surface of said first end portion; and said first end portion is disposed to be supported on said transition fold bent in the the shape of a circular arc.

13. The shock absorber as claimed in claim 12, wherein said first end portion is disposed to be supported on said piston.

14. The shock absorber as claimed in claim 13, wherein said first end portion comprises a plurality of individual webs.

15. The shock absorber as claimed in claim 14, wherein said piston ring is disposed to be supported on said first axial surface of said piston and said second axial surface of said piston.

16. The shock absorber as claimed in claim 15, wherein:

said piston ring comprises a spring material layer to provide a spring function of said piston ring; and said piston ring comprises a sealing layer to seal with said cylinder wall.

17. The shock absorber as claimed in claim 1, wherein:

said bent around portion is configured to have a springiness to bias said piston ring toward said cylinder wall.

18. A method of manufacturing a shock absorber for a motor vehicle, which shock absorber comprises a cylinder comprising a cylinder wall, a first end, and a second end; said cylinder defining a chamber therein, said chamber containing a damping fluid; a piston rod sealingly projecting into said cylinder and being axially displaceable with respect to said cylinder; said piston rod having a longitudinal axis, the longitudinal axis having an axial direction parallel to the longitudinal axis of said piston rod; a piston being attached to said piston rod, said piston being slidably disposed within said cylinder to divide said chamber into first and second chambers; said piston comprising a lateral surface disposed to face towards said cylinder wall; said piston comprising a first axial surface disposed to face towards said first end of said cylinder; said piston comprising a second axial surface disposed to face towards said second end of said cylinder; a piston ring being disposed to provide a seal between said piston and said cylinder wall; said piston ring being disposed to cover said lateral surface of said piston; said piston ring having a width dimension in the axial direction; said lateral surface of said piston having a width dimension in the axial direction; said piston ring width dimension being greater than said lateral surface width dimension; said piston ring comprising a middle portion, a first end portion, and a second end portion, said first end portion and said second end portion extending in substantially opposite axial directions from said middle portion; said first end portion comprising a bent around portion to engage at least said first axial surface of said piston; and said bent around portion being bent around substantially on itself; said method of manufacturing a piston for a shock absorber for a motor vehicle comprising the steps of:

providing a piston comprising a lateral surface for being disposed to face towards a cylinder wall, a first axial surface for being disposed to face towards a first end of a cylinder, and a second axial surface for being disposed to face towards a second end of the cylinder;

providing a piston rod;

providing a cylinder, said cylinder defining a chamber therein;

providing damping fluid;

providing a piston ring blank comprising a middle portion, first end, and a second end;

bending said first end of said piston ring blank substantially on itself to form a bent around portion to thereby form a piston ring;

placing said piston ring on said piston to engage at least said first axial surface with said bent around portion of said piston ring;

connecting said piston to an end of said piston rod;

disposing said piston in said chamber;

placing said damping fluid in said chamber; and sealing around said piston rod with respect to said chamber.

19. The method as claimed in claim 18, wherein:

said step of bending to form a bent around portion forms a first bent around portion;

said step of bending comprises bending said second end of said piston ring blank substantially on itself to form a second bent around portion;

said step of placing said piston ring on said piston comprises placing said piston ring on said piston to engage said first axial surface with said first bent around portion and to engage said second axial surface with said second bent around portion; and said step of bending comprises bending each of said first and said second bent around portions in the shape of a substantially circular arc.

20. A shock absorber for a motor vehicle, said shock absorber comprising:

a cylinder comprising a cylinder wall, a first end, and a second end;

said cylinder defining a chamber therein, said chamber containing a damping fluid;

a piston rod sealingly projecting into said cylinder and being axially displaceable with respect to said cylinder;

said piston rod having a longitudinal axis, the longitudinal axis having an axial direction parallel to the longitudinal axis of said piston rod;

a piston being attached to said piston rod, said piston being slidably disposed within said cylinder to divide said chamber into first and second chambers;

said piston comprising a lateral surface disposed to face towards said cylinder wall;

said piston comprising a first axial surface disposed to face towards said first end of said cylinder;

said piston comprising a second axial surface disposed to face towards said second end of said cylinder;

a piston ring being disposed to provide a seal between said piston and said cylinder wall;

said piston ring being disposed to cover said lateral surface of said piston;

said piston ring comprising a middle portion, a first end portion, and a second end portion, said first end portion and said second end portion extending in substantially opposite axial directions from said middle portion;

said first end portion comprising a spring to bias said piston ring toward said cylinder wall and to engage at least said first axial surface of said piston;

said spring comprising a bent around portion of said first end portion of said piston ring; and said bent around portion being bent around substantially on itself.

* * * * *

UNITED STATES PATENT AND TRADEMARK OFFICE
CERTIFICATE OF CORRECTION

PATENT NO. : 5,655,634
DATED : August 12, 1997
INVENTOR(S) : Manfred GRUNDEI, Norbert DEPPERT, Peter WÖLKI and Robert WIESER It is certified that error appears in the above-identified patent and that said Letters Patent is hereby corrected as shown below:

On the title page, item [54], line 4 of the Title, after the second occurrence of 'A', delete "CYCLINDER" and insert --CYLINDER--.

In column 1, line 4 of the Title, after the second occurrence of 'A', delete "CYCLINDER" and insert --CYLINDER--.

In column 3, line 57, after 'and', delete "3a." and insert --3C.--.

In column 6, line 54, Claim 11, after 'disposed', delete "et" and insert --at--.

Signed and Sealed this

Ninth Day of December, 1997

Attest:

Attesting Officer

BRUCE LEHMAN

Commissioner of Patents and Trademarks